Nov. 22, 1955      A. B. DE SALARDI      2,724,403
FLOAT CONTROL DEVICE
Filed June 27, 1952      5 Sheets-Sheet 3
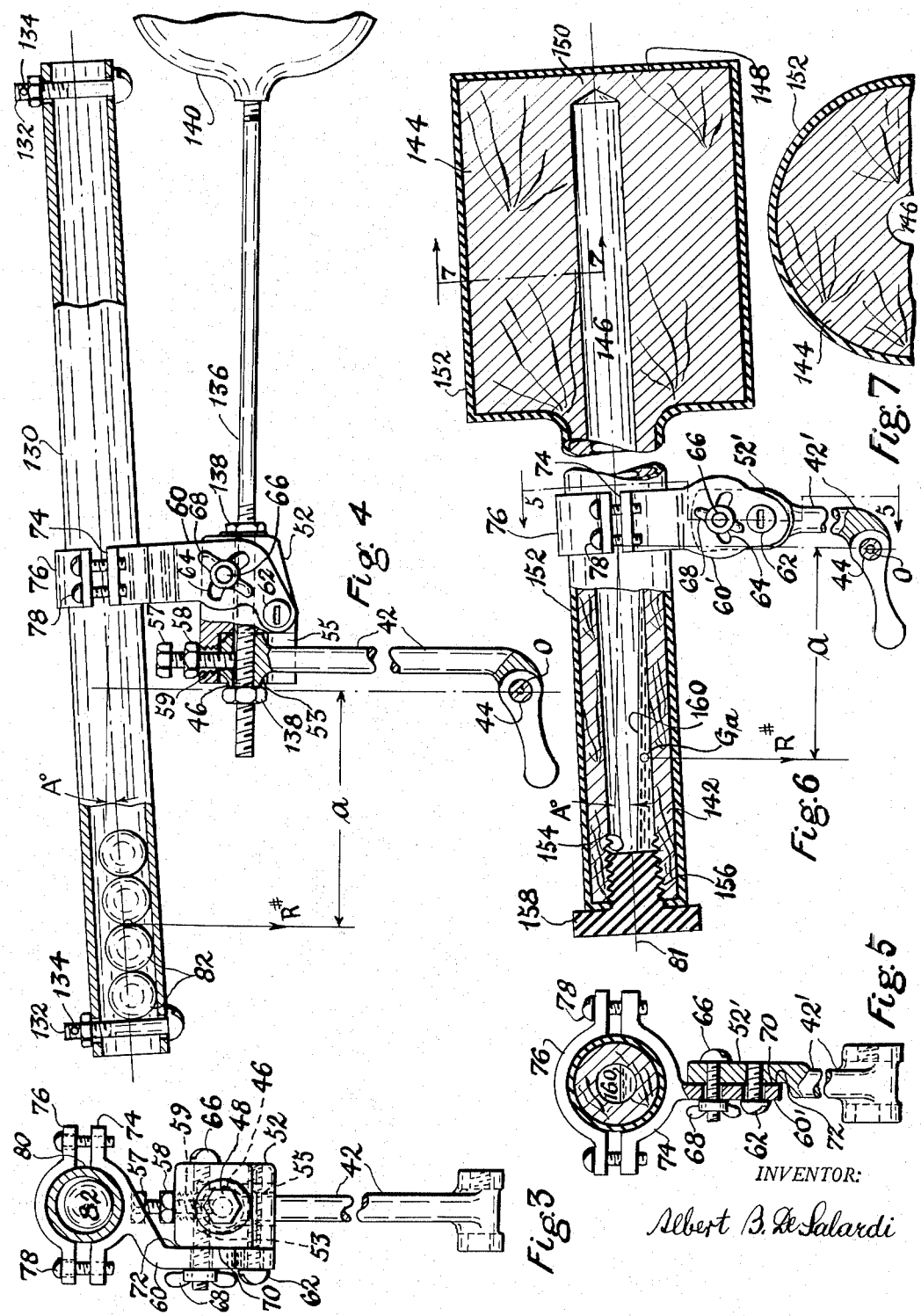
INVENTOR:
Albert B. DeSalardi

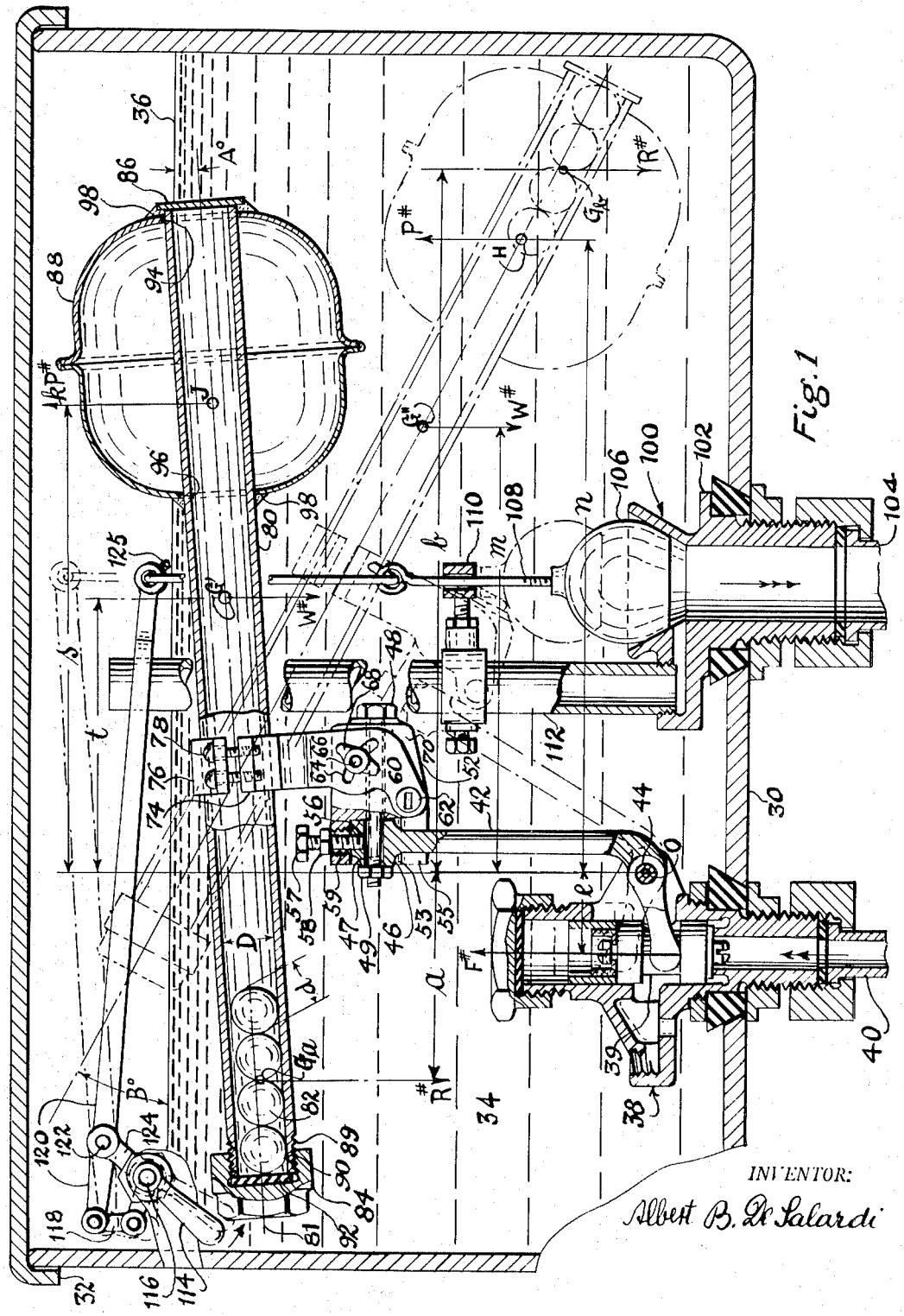

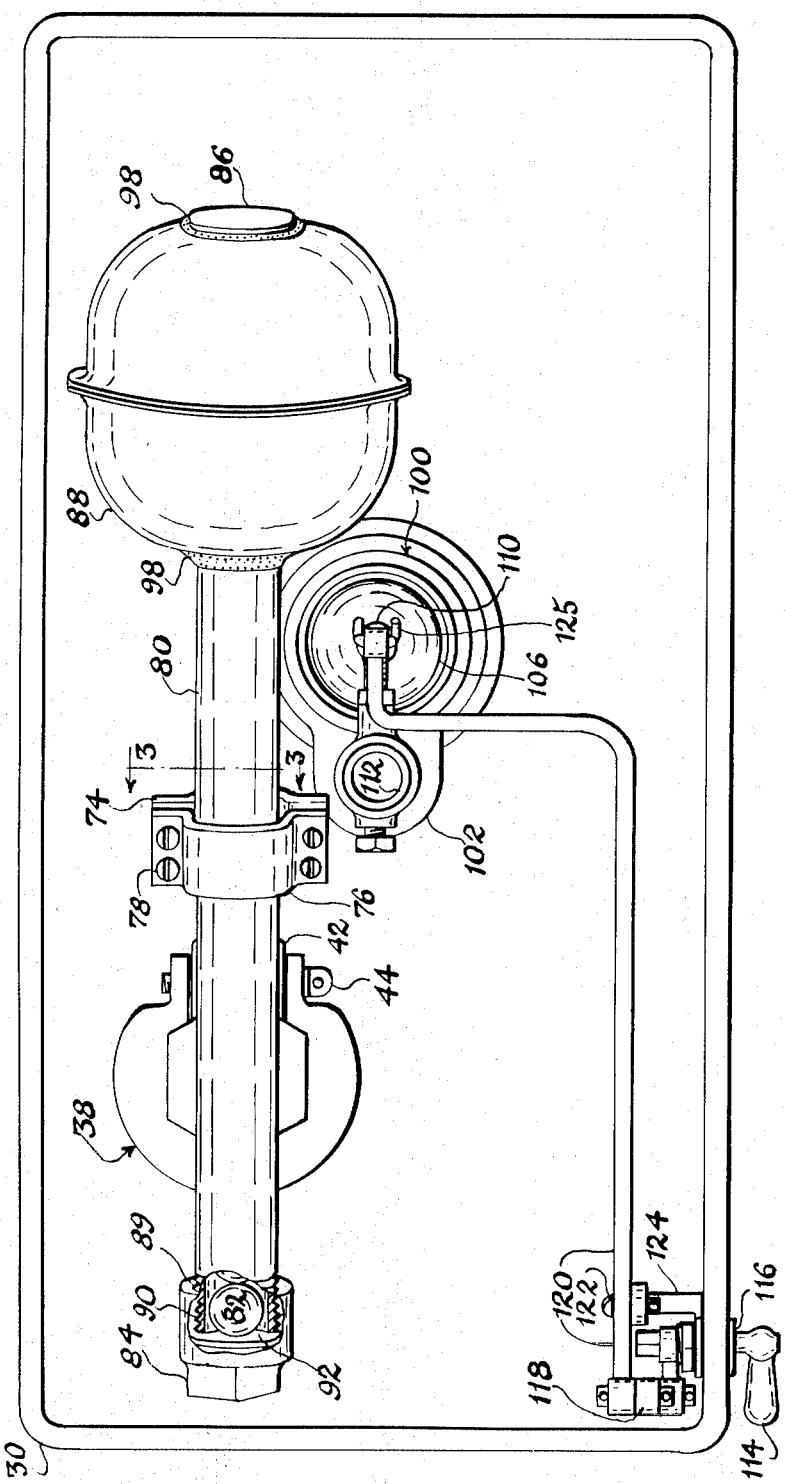

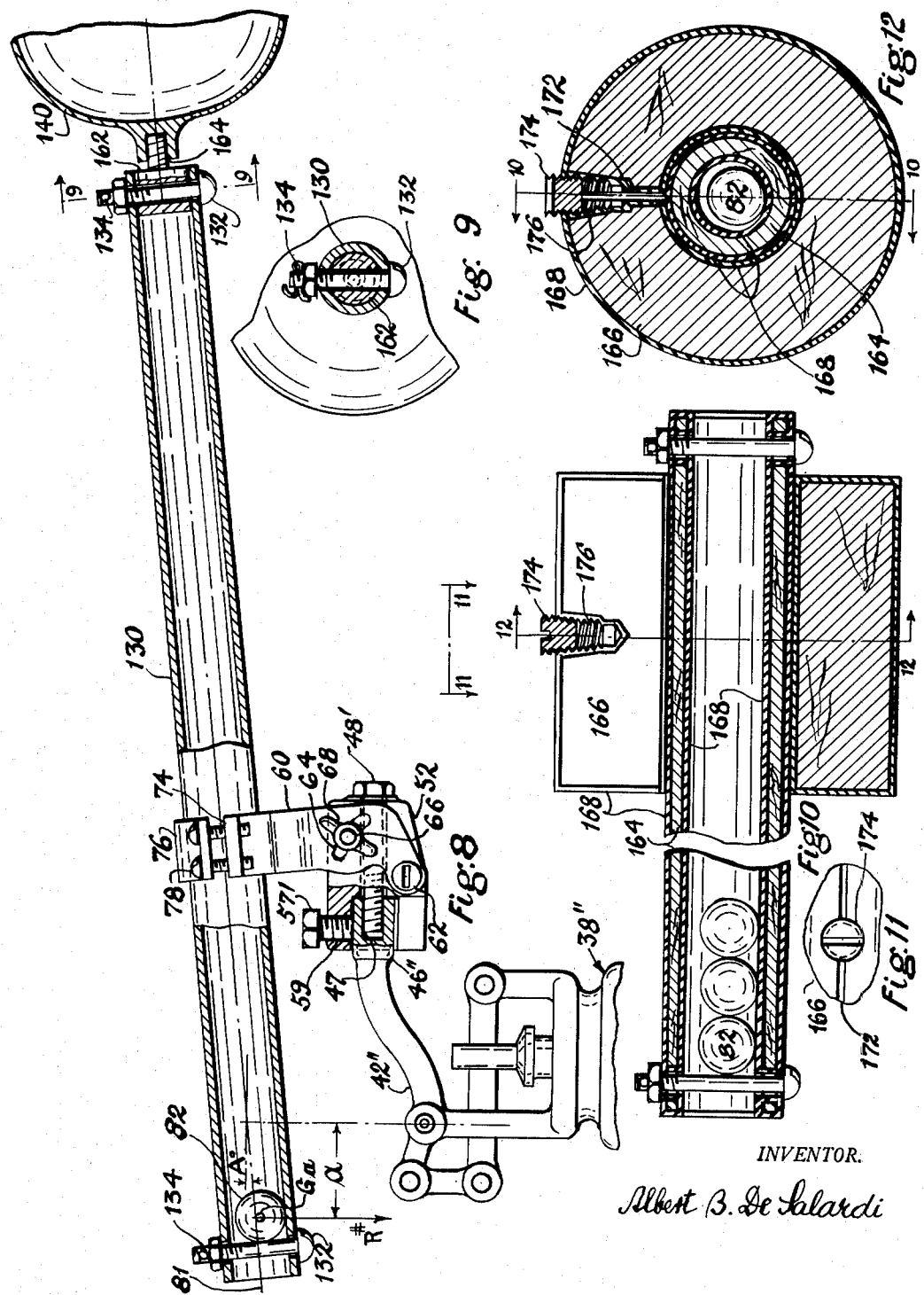

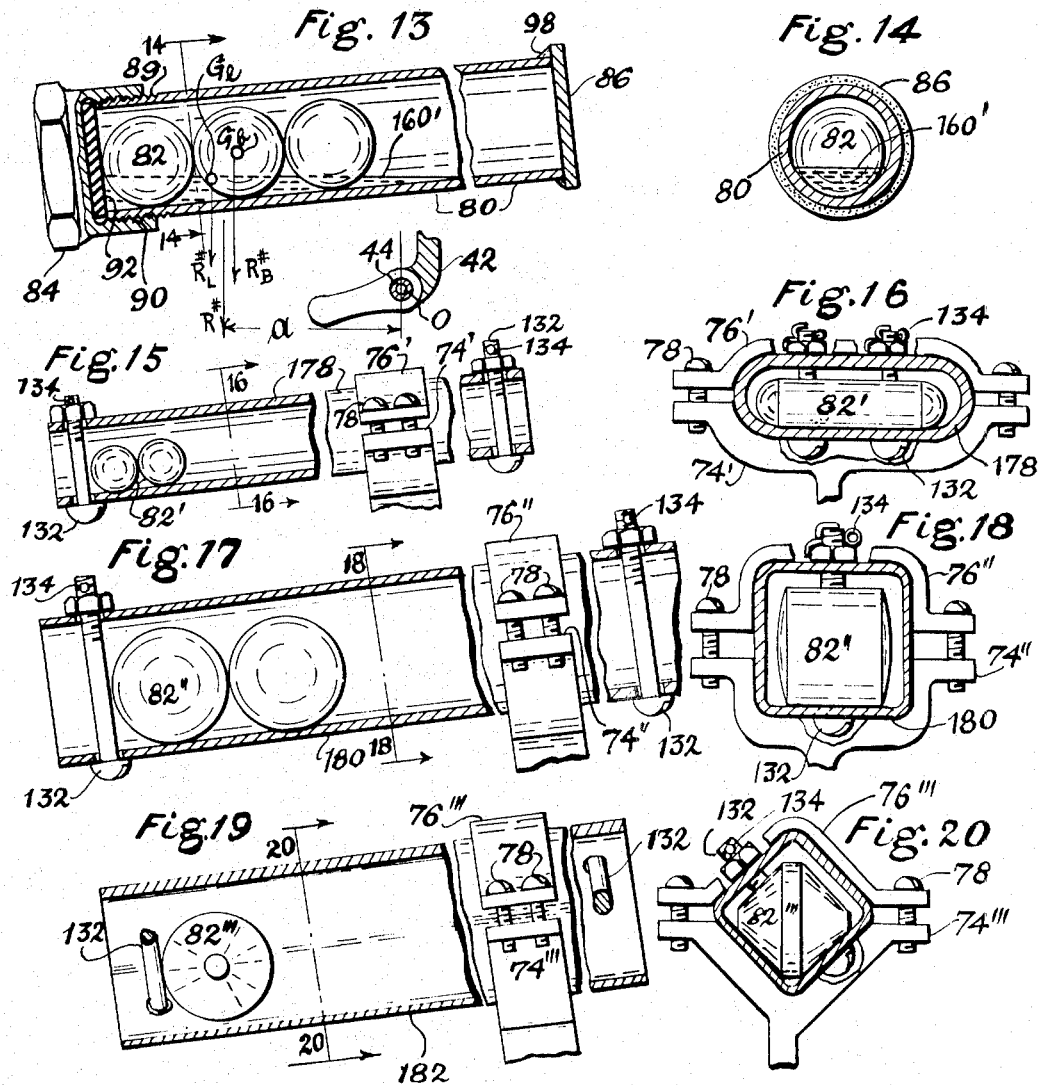

United States Patent Office 2,724,403
Patented Nov. 22, 1955

2,724,403
FLOAT CONTROL DEVICE

Albert B. De Salardi, Pittsburgh, Pa., assignor to Floyd J. Connors, Wilkinsburg, Pa.

Application June 27, 1952, Serial No. 296,048

4 Claims. (Cl. 137—419)

This invention pertains to float control devices and to methods of controlling floats for maintaining a predetermined maximum- or high-level of a liquid in a container specifically such as a flush tank but generally including also boiler feed water reservoirs, fuel tanks for oil burners, carbureter fuel chambers and other similar purpose receptacles.

Considering specifically flush tanks and their associated equipment, their operation was up to date based upon the float-buoyancy, a force opposing gravity, their difference, supplying the motive force, being either substantially constant or relatively slowly changing in response to the variation of the level of the liquid in the container. Consequently, any increase of friction between the relatively moving parts, by sedimentation or otherwise, caused excessive wear, binding or sticking of the same resulting in frequent failure or unsatisfactory operation of the whole system. Furthermore, during flushing the liquid level in the container and with it the pressure head is subject to an initial quick drop and the outflowing liquid to a correspondingly rapid deceleration which is most undesirable as it reduces quadratically the kinetic energy that does the flushing, impairing its effectiveness.

My invention obviates these and other drawbacks by employing a gravitational force which alternately diminishes and increases, respectively, the buoyancy of the float and which in addition provides an impact tending to overcome friction in and to accelerate the opening and closing, respectively, of the inlet valve. Acceleration of the opening of the valve increases the inflow of the liquid, raises its average height, and the velocity and quantity of the outflow. Acceleration of the closing of the inlet valve closes it abruptly with an additional force when the predetermined liquid level is arrived at. These beneficial effects are equivalent with those resulting in increasing the dimensions and capacity of a flush tank or container. Conversely, my invention makes it possible to use a smaller tank, with the same effect as a larger one in a conventional system thereby saving material, space and costs.

I achieve these and other useful effects in a float control device utilizing a control lever oscillatable about a fulcrum pin for controlling an inlet valve, by employing the weights of antifrictional bodies and/or liquids rolling or flowing in a tubular guide having closures or stops at both end portions and extending beyond the fulcrum pin respectively its fulcrum center on both sides in the plane of oscillation of the conventionally oscillatable control lever of the inlet valve, generally used in the art.

Hence the objects of my invention are to create—in a high-level maintaining system having a container for liquid and a control lever oscillatable about a fulcrum pin to actuate a control lever—a float control device which:

First, employs a tubular guide means having closures or stops at both end portions and extends beyond the fulcrum center on both sides in the plane of oscillation of the control lever, said guide means carrying reciprocatable antifriction elements such as balls, rollers and similar bodies having a rotary peripheral surface and/or a liquid substance for gravity caused traveling back and forth between the stops in the guide according to its angle formed with the horizontal, the weight thereof exerting turning moments about the fulcrum center in alternately opposite directions accompanied by impact, accelerating the opening of the inlet valve and closing it with added force when the predetermined high level of the liquid in the container is obtained;

Second, is provided with float means and attachment means fixing the guide means and float means rigidly to the inlet valve control lever for oscillation in unison therewith around its fulcrum in response to variation of the liquid level in the container and corresponding change in position of the float means;

Third, has adjustment means for selectively setting the angular positions of the float means and guide means relative to the control lever;

Fourth, employs float means integral with tubular guide means the latter extending through the former;

Fifth, has float means of solid material of relatively low density such as wood which carries a liquid-proof coating;

Sixth, is provided with solid, radially half-way split float means from relatively low density material, such as wood, of sufficient resilience to hold, by force fit, the tubular guide, extending therethrough with the necessary friction to maintain their assembly position and carries split-regulating means for varying the fit incident to changing that position.

It is a further object of this invention to provide a method of float control in high liquid level maintaining systems consisting of applying a gravitational force for alternatingly opposing and enhancing, respectively the buoyancy of the float by moving relative thereto the line of action of said force in response to the height of the level of the liquid in the system.

The accomplishment of these and other objects will appear to those versed in the art by perusing this specification and the accompanying drawing in which:

Fig. 1 shows the elevation, chiefly in section of a conventional tank or flush container equipped with a conventional inlet valve, outlet valve, outlet valve-opening mechanism together with the first preferred embodiment of the invented float control including a tubular guide having stops at both end portions and leading suitable spherical balls beyond the center of the fulcrum pin or fulcrum center of the control lever from one side to the other, the tubular guide being rigidly fixed by an adjustable bracket to the control lever. The float is carried by the tubular guide which passes through its axial central portion;

Fig. 2 is the plan view of the device shown in Fig. 1;

Fig. 3 is a partial view, partly in cross section, on line 3—3 in Fig. 2;

Fig. 4 is a view, partly in section, of a second preferred embodiment of my invention in which a conventional flush tank with its valves and other associated equipment is represented by the oscillating control lever carrying the conventional float bar and float; the adjustable bracket is also fixed to the control lever fastening thereto a tubular guide having through-going bolts as stops at both end portions between which four balls are rollably arranged within the guide;

Fig. 5 is a fragmental view, partly in section, taken on broken line 5—5 in Fig. 6 of a third preferred embodiment;

Fig. 6 is the elevational view, partly in section, of the third preferred embodiment in which the tubular guide and the float are integral and made of wood or similar material of low density having a liquid-proof coating, a rubber plug threaded at one end of the guide portion and a dead-eye at the other serve as stops, and, the guide carrying a substance in liquid state of comparatively high density, such as mercury, carbon tetra iodide, carbon tetra chloride, etc. in suitable quantity; one part of the adjustable bracket fastening the guide to the control lever is integral therewith.

Fig. 7 is a partial cross sectional view on line 7—7 in Fig. 6;

Fig. 8 is the partial elevational view, partly in section, of the fourth preferred embodiment of my invention which forms an attachment to a conventonal inlet valve. The adjustable bracket holds the tubular guide which carries the float mounted on one stop thereof and is attached to the control lever of the valve; the guide is shown to contain one single ball;

Fig. 9 is a partial view partly in section, taken on line 9—9 in Fig. 8;

Fig. 10 is the elevational sectional view of a modified tubular guide and float, both being shown to be made from wood or similar low density material and are provided with liquid resisting coating. The float is solid, radially half way split and with its central bore seated with force fit upon the guide. Split-adjustment means, such as a conical plug shown, threaded into the float, regulates the tightness of the fit, hence the created friction between float and guide keeping them in their assembled relative positions;

Fig. 11 is a partial plan view taken on line 11—11 in Fig. 10;

Fig. 12 is a sectional view taken on line 12—12 in Fig. 10;

Fig. 13 is a partial sectional view of a modification in which rollable solid bodies, shown to be spherical balls, and a liquid substance are reciprocably confined within the tubular guide, sealed by its stops located at the end portions;

Fig. 14 is the sectional view taken on line 14—14 in Fig. 13;

Fig. 15 is the partial elevational view, chiefly in section, of a modified form of the tubular guide having a uniform cross section shaped like a flattened O accommodating elongated cylindrical rollers having hemispherical end caps; the bracket is also suitably shaped;

Fig. 16 is a sectional view taken on line 16—16 in Fig. 15;

Fig. 17 is a partial elevational view, chiefly in section, of a modified guide having a uniform, substantially square cross section and accommodating cylindrical rollers having spherical-cap bases; the coacting portions of the adjustable bracket is shown in view illustrating how its shape follows that of the guide;

Fig. 18 is a sectional view taken on line 18—18 in Fig. 17;

Fig. 19 is a partial elevational view, chiefly in section, of a modified guide having a uniform, substantially square cross section and accommodating one roller composed of two equal straight conical frustra joined at their larger bases by a short cylindrical portion; a broken away portion of the coacting part of the adjustable bracket is also shown in view;

Fig. 20 is the sectional view taken on line 20—20 in Fig. 19.

Referring more particularly to Figures 1–3 of the accompanying drawings a flush tank or container 30, having a cover 32 holds a liquid 34 which is generally maintained at a predetermined level 36. A conventional inlet valve generally designated by 38, shown to be of the well known "Mansfield" type, is mounted in container 30 and joined by conventional connections and seals with water supply pipe 40. For opening and closing inlet valve 38 double armed control lever 42 is oscillatably mounted on it by fulcrum means such as fulcrum pin 44 shown, having fulcrum center O.

As shown in Fig. 1 this fulcrum center O is at the distance $e$ from the vertical axis of valve piston 39 where the force, necessary to close the valve without leakage and its equal reaction F# acts upon control lever 42.

Conventional control lever 42 has, at the end portion of its longer arm, a head 46 through which extends a cylindrical hole 47 for fastening a bar, ordinarily carrying a float. In this embodiment, however, the place of this bar is taken by bolt 48 fastened by nut 49 to head 46 and fixing thereto the stationary portion 52 of a bracket or sleeve.

Stationary bracket portion 52 has an aperture 53 which is large enough to receive the larger part of head 46, and a through-going hole 54 registering with hole 47. Aperture 53 is provided with a downwardly open slot 55 receiving the arm portion of control lever 42 that joins head 46. In the top of head 46 is a threaded hole 56 which normally receives a set screw to lock the conventional float bar (which is here eliminated). This set screw is also eliminated and substituted by a longer set screw 57 having thereon locknut 58 and locking bolt 48 to head 46 by extending through a threaded hole 59 provided in bracket portion 52. Threaded hole 59 reaches aperture 53 and registers as to their centerlines with hole 56 but is of larger diameter to take care of manufacturing inaccuracies. Therefore, if hole 56 carries the conventional threads $1/4''$–20, hole 59 carries say $3/8''$–16. In this embodiment lockscrew 57 has $1/4''$–20 threads but in case the valve control lever is minus hole 56 a larger set screw may be used through hole 59 to lock the head of the control lever to stationary bracket portion 52 which makes it applicable for various types of conventional inlet valves.

Adjustable bracket portion 60 is oscillatably mounted on stationary portion 52 by an arcuate element tilting screw 62 threaded in the stationary portion. The adjustable bracket portion 60 has an arcuate slot 64 centering with a suitable radius at tilting screw 68 through which slot locking screw 66, threaded in the stationary portion 52 which is part of a valve operating float lever, extends and carries a suitable nut, shown to be a thumb nut 68 serving to fasten the bracket portions together in their set positions.

As best seen in Fig. 3, stationary bracket portion 52 has a flat surface or face 70 turned toward the similarly flat face 72 of adjustable bracket portion 60; on these faces the two portions slide during adjustment their relative position being fixed by friction caused by the pressure of thumb nut 68 which is tightened after setting. The upper end region of adjustable bracket portion 60 is split to form a base 74 and a cover 76 both having radial flanges for receiving fastening means such as screws 78, shown.

Base 74 and cover 76 are suitably shaped to embrace securely tubular guide means such as the elongated cylindrical counterbalancing tube 80, hence the inner surfaces of the former are also preferably cylindrical.

Tube or guide 80 contains at least one antifriction element or body such as balls, rollers or other shapes having rotary peripheral surfaces, their numbers and shapes being predetermined according to the desired magnitude of the effects of their operation, and also to conform to the dimensions of guide 80, which has longitudinal axis 81. These antifriction elements or bodies will be referred to hereinafter as "movable weights" and this expression may also include within its scope the above elements and also a liquid such as water or mercury.

This embodiment shows four spherical balls 82 arranged in guide 80 the diameter $d$ of the former being somewhat smaller than D, the diameter of the inner surface of the latter so that the balls may freely roll in the guide according to its longitudinal sloping to the horizontal; their end position is fixed by stops 84 and 86 at the end portions of guide 80. As shown in Fig. 1, the center of gravity of the masses of the four balls is at $G_a$ at a distance $a$ from fulcrum centrum O in closed position of the valve 38 in which the water level 36 is at the predetermined maximum and the longitudinal axis 81 of guide 80 forms acute angle A⁰ with the horizontal as set by the relatively adjustable bracket portions 52 and 60. The end positions of the balls determine the maximum turning moment they exert about fulcrum pin 44 or fulcrum center O, and also the directions of their moments. These end positions and with them the magnitudes of their arms and moments may be selectively changed by loosening screws 78, sliding guide 80 relative to the base and cover 74 and 76, respectively, in the desired direction and tightening screws 78 again.

Guide 80 carries on its longer cantilever portion hollow float 88 having the shape of any suitable body with substantially rotary outer surface coaxial with longitudinal axis 81. At the other end portion of guide 80 it has outer threads 89 engaging inner threads 90 of stop 84 which is shown to be a cap sealing the tubular guide with the interposed gasket or washer 92 made of suitable material such as rubber, as shown, leather, velumoid, fibre, plastic or the like. The other end of guide 80 is permanently sealed by stop 86 which is shown to be a disk welded, brazed, soldered or otherwise fluid-tightly fastened to guide 80 and float 88 around the central holes 94 and 96 through which guide 80 extends. These circumferential welds, brazings or solderings are denoted by 98. In case guide 80 and/or float 88 are made, instead of metal, from hard rubber, fibre, plastic, micarta, glass or like substances 98 represents suitable cementing or fusing compounds.

The outlet valve of the container, its connections, opening leverage and handle and the overflow pipe are of well known conventional design and similarly to the inlet valve 38 proper and tank 30 do not form part of the invention hence their detailed description and particular showing is dispensed with and they are shown and mentioned only to the extent to which their operation is influenced by the invented float control.

The outlet valve in general is designated by 100 having a valve seating body 102 sealingly fastened in any approved manner to the bottom portion of container 30 and sealingly connected to outlet flow pipe 104. Coacting with valve seating body 102 is ball valve 106 fastened to stem 108 guided vertically by sleeve 110 which is fixed to overflow pipe 112. Handle 114, oscillatably mounted at 116 on container 30 is connected by a conventional linkage 118 and lever 120 fulcrumed at 122 on stationary bracket 124 engaging link 125 and with suitable play valve stem 108 lifting ball valve 106 out of its seat in body 102.

As shown in Fig. 1 in full lines when the water level 36 is at predetermined maximum and float 88 and guide 80 occupy their top positions the center of gravity of the float and guide is at G' at a distance $t$ from fulcrum center O forming the arm of their combined weight W#. Distance from O means horizontal distance.

The buoyant force $kP\#$ acts in the shown closing position of valve 38, at the distance $s$ from O.

When container 30 is flushed by lifting outlet valve 106, float 88 with the attached guide 80 occupy their lowest positions determined by the outwardmost oscillation of control lever 42 at total opening of inlet valve 38. The longitudinal axis 81 of the guide 80 forms angle B⁰ with the horizontal, as shown in Fig. 1 in dot and dash lines, the center of gravity of the total mass W of float and guide becomes located at G at $m$ distance from O, that of the balls 82 with force R# at G_b at $b$ distance from O, the buoyancy of the float and guide P is effective at H at a distance $n$ from O. The buoyancy varies by factor $k$.

The described first preferred embodiment operates as follows:

In installing the invented float control, valve 38 is held closed by control lever 42 and guide 80 is positioned relative to adjustable bracket portion 60 so that at the predetermined maximum water level 36 (about 1″ below the top of overflow pipe 112) longitudinal axis 81 of guide 80 forms a small acute angle A⁰ with the horizontal (which angle is however greater than that that starts balls 82 rolling toward stop 84) and the sum of the turning moments of the buoyancy and weights about O become greater than that of the resistance to closing the valve. Mathematically at high level $$eF \angle kPs - tW + aR \qquad (1)$$

where F is the lifting force exerted on the valve by water pressure and $e$ is the distance from the center of the valve to the fulcrum O.

By properly setting guide 80 and adjustable bracket arm 60 and employing a suitable number of balls, $s$, $a$ and R may be varied so that inequality (1) is satisfied with a suitable margin to keep the inlet valve 38 safely closed when the water or other liquid is at high level in tank 30.

During flushing the float drops and the opening of valve 38 is effected by the difference of the moments of the weights and the buoyancy about fulcrum center O. The requirement for opening is $$eF' \angle mW + bR - nP \qquad (2)$$

F' being the sum of the frictional forces opposing the opening of valve 38. The algebraic difference of the two sides in (2) represents the moment which causes acceleration in the valve opening.

Applying unequalities (1) and (2) to conventional devices lacking the invented float control hence also the rollable antifriction bodies such as balls 82, the value of R=zero. Consequently when balls 82 are employed the right side of equations (1) and (2) are greater by $aR$ and $bR$, respectively, than the corresponding unequalities for conventional devices. In other words valve 38 will be closed with a greater moment and opened with a greater acceleration as a result of the invented float control.

Balls 82 are arrested in their movements by stops 84 and 86, respectively in each case with an impact according to their kinetic energy E. From mechanics $$E = \tfrac{1}{2} M v^2$$

where M equals the total mass and $v$ equals the velocity of their motion. Neglecting the influence of the resistance of the air and/or the liquid $$V = \sqrt{\frac{2E}{M}}$$

However, since $$M = \frac{w}{g}$$

and $E = WS \sin B$, $$v = \sqrt{2gS \sin B}$$

where S is the space traversed between the two stops in the guide by the center of gravity of the balls and $g$ equals the gravitational acceleration, taken as 32.16 feet per sec.

Therefore it is evident that by proper selection of the size and density of the balls, the length and slope of the guide, the kinetic energy of the balls could be made sufficient to overcome by their impact with the stops the usual increase of friction between the moving parts and enhance the undisturbed operation of the valve.

It can be seen that weight R# of the employed balls 82 exerts a turning moment about O in counterclockwise direction when the level of the liquid is approaching the maximum (36) and becomes clockwise during flushing when the sloping of guide 80 is on the side of stop 84 or 86, respectively. I call these positions in which the sloping of the guide causes rolling of the balls the advanced positions of closing and opening, respectively. R is constant and the variation of its line of action is caused by gravity.

The results of the effects of the invented float control in accelerating the opening of the inlet valve 38 during the advanced stage of flushing are an increase of inflow of water into the tank, a more rapid raising of its level providing for a higher average, and correspondingly greater velocity and larger quantity of outflow of the water during flushing thereby increasing the overall effect of flushing. Furthermore sticking of the moving parts due to wear is overcome by the dynamic effects of the impact of the balls with the stops and with each other, respectively, and by the added turning moments closing the valve safely at maximum liquid level, avoiding leakage.

Fig. 4 illustrates the second preferred embodiment of my invention which differs from the first in that tubular guide 130 is open at both ends. Each end portion of the guide 130 is provided with a bolt 132 that extends therethrough and is secured in place by means of cotter pins 134. The bolts 132 serve as stops for the freely rolling balls 82 positioned in the guide 130. Also stationary bracket portion 52, together with control lever head 46 carry the conventional threaded float bar 136 positioned by nuts 138; the conventional float 140 is threaded on bar 136 in the usual manner.

This embodiment is attachable to a flush tank having a Mansfield type valve making full use of the old parts (excepting the substitution of setscrew 57 with nut 58 for the old setscrew) endowing the old system with the benefits of my invention.

The operation of this embodiment is the same as that of the first one hence its description need not to be repeated.

Figures 5 to 7 represent the third preferred embodiment of my invention which differs from the first one in the following respects:

The guide means consist of an elongated tubular body 142 that is integral with the float 144 forming a concentric cylinder around one end portion of the guide the bore 146 of which terminates a short distance from the end surface 148 of the float forming a dead eye 150 serving as a stop.

Both guide 142 and float 144 are made of solid, low density material such as balsa wood, white pine, etc. and provided, at least on the outer surface with a sealing cover of liquidproof coating 152 which permanently adheres to the material, such as rubber, lacquer, paint, plastic, etc. The thickness of coating 152 is shown exaggerated.

At the opposite end portion to the float, guide 142 carries threads 154 that engage the outer threads 156 of a sealing plug 158. Threads 154 and 156 may be conical for positive sealing. The plug 158 may be made from rubber, as shown, or micarta, fibre, plastic or similar material.

For the reciprocating bodies in the guide 142 liquid substances 160 of preferably high density may be employed as their molecules may be considered as elementary spheres rolling upon the supporting surface and each other. Such substances may be mercury, carbontetraiodide, carbontetrachloride and the like. These substances are liquids at ordinary atmospheric temperatures and their quantity employed will depend upon the magnitude of their effect desired.

The stationary portion 52' of the bracket holding guide 142 is made integral with the outer end portion of control lever 42' and is provided with threaded holes for tilting screw 62 and locking screw 66. The adjustable bracket portion 60' follows the outline of the stationary portion 52' and both have the coacting flat faces 70' and 72', respectively.

The center of gravity of liquid substance 160 is at $G_a$ at a distance $a$ from fulcrum center O at closed position of the valve (not shown) when axis 81 of guide 142 forms angle $A^0$ with the horizontal.

The operation of this third preferred embodiment is the same as that of the first.

Figs. 8 and 9 illustrate the fourth preferred embodiment of the invention in which the float control is attached to a well known conventional "high tank valve," generally designated by 38" having a control lever 42" oscillatably mounted by fulcrum pin 44 which has fulcrum center O.

Control lever 42" has at the end portion of its longer arm a head 46" with a threaded hole 47 into which ordinarily a float bar is inserted which bar is here eliminated and substituted by screw 48' which fastens the stationary bracket portion 52 to head 46" which is locked by set screw 57' held in threaded hole 59, to stationary bracket portion 52.

Clamped between base 74 and cover 76 of the adjustable bracket portion 60 is cylindrical tubular guide 130 which is shown to be identical to that in the second embodiment in Fig. 4 except that one stop, 162, is a plug fitting the inner surface of the guide and held thereto by through-going bolt 132 and being equipped with a threaded extension 164 carrying thereon a conventional float 140.

Only one ball 82 is shown to be inserted in guide 130 but it will be understood that several of them may be used according to the magnitude of their desired effect.

This embodiment which may be used as an attachment to a conventional "high tank valve" 38" operates in the same manner as the first preferred embodiment.

Figs. 10 to 12 represent the fifth preferred embodiment which differs from the third (shown in Figs. 5 to 7) in that the guide 164 and float 166 are individual, relatively adjustable parts shown to be made from suitable low density material such as balsa wood, white pine and the like, their whole surfaces being covered by a liquid proof and permanent coating 168 shown in the drawing in excessive thickness for the sake of clarity.

The guide 164, which is tubular and is shown to carry three spherical balls 82, extends through a central bore 170 of float 166 that is radially halfway split by slot 172. The float 166 carries split-regulating means such as conical plug 174 threaded in conical bore 176. By advancing plug 174 by turning it in the proper direction split or slot 172 is widened and the resilient radial pressure upon guide 164 relieved allowing relative shifting of guide and float. Moving plug 174 peripherally the split is narrowed by the resiliency of the float material, and the pressure and friction between guide and float is reestablished. The resiliency of the float material and the dimension of the central hole 170 is such that the fit between float and guide is a force-fit developing sufficient friction to keep guide 164 and float 166 in assembled relative position during operation, which is substantially the same as that of the first embodiment.

Figs. 13 and 14 represent a modification consisting in employing in tubular guide 80 balls and liquid substance 160' of preferably high density such as carbontetraiodide, carbontetrachloride and the like which do not corrode the balls and the guide. The center of gravity of the balls being at $G_b$ and that of the liquid being at $G_1$ their respective weights being $R_B\#$ and $R_L\#$, respectively, and their resultant $R\# = R_B\# + R_L\#$ being located at $a$ distance from fulcrum center O.

The operation of this modification is the same as that of the first embodiment.

Figs. 15 and 16 show a modification of the guide and antifriction rolling bodies and also of the base and cover of the adjustable bracket portion.

The tubular guide 178 has a flattened O shape followed by those of base 74' and cover 76' and the antifriction rolling bodies 82' are elongated cylinders capped by hemispheres.

Figs. 17 and 18 show a modification of guide, rolling bodies, base and cover of the bracket. The guide 180 is tubular of substantially square uniform cross section which shape is followed by those of the base 74" and 76" cover of the bracket; the antifriction 82" rolling bodies are cylindrical with spherical-cap bases.

Figs. 19 and 20 show a modification of the guide, base, cover and antifriction rolling bodies. The guide 182 is tubular and of uniform square cross section turned on one edge which shape is followed by base 74''' and cover 76''' of the adjustable bracket portion; the antifriction rolling bodies (only one is shown) 82''' are composed of two symmetrical straight cone frustra joined at their larger base by a cylindrical portion.

Having fully disclosed my invention and described and illustrated preferred embodiments thereof it will be understood that various changes and modifications may be made therein by those versed in the art without departing from the spirit and scope of my invention, hence it should be understood that these embodiments were presented as illustrations only and I do not intend to be restricted thereto with the exclusion of their equivalents, but what I claim and intend to secure by Letters Patent is:

1. An apparatus for controlling the level of liquid in a container comprising, an inlet valve connected in a source of liquid, means including a control lever oscillatable in a plane about a fulcrum for opening said valve at liquid levels below said predetermined level and closing said valve when said liquid is at said predetermined level, an elongated tubular guide means having stop means at each end thereof, a buoyant moment producing float secured to one end of said tubular guide means, said tubular guide means being secured to said control lever with a substantial portion of said tubular guide means extending on each side of said fulcrum in the plane of oscillation of said control lever, impact and static force producing means positioned in said tubular guide means for reciprocating movement from one end to the other end of said tubular guide means in accordance with the angle between said tubular guide means and the horizontal, said impact and static force producing means initially providing an impact moment and thereafter providing a static moment about said fulcrum for selectively opening and closing said valve when said one end of said tubular guide means respectively falls below the horizontal and rises above the horizontal, and means for individually adjusting the impact moment and the static moment provided by said impact and static force producing means when said one end of said tubular guide means rises above the horizontal, so that the impact moment is sufficient to rapidly close said valve and the static moment is just sufficient to maintain said valve closed, said last mentioned means comprising first adjustment means for varying the lengths of said portions of said tubular guide means on both sides of said fulcrum to control said static moment and second adjustment means for varying the angle between said tubular guide means and the horizontal when said control valve is closed to control said impact moment.

2. An apparatus for controlling the level of liquid in a container comprising, an inlet valve connected to a source of liquid, means including a control lever oscillatable in a plane about a fulcrum for opening said valve at liquid levels below said predetermined level and closing said valve when said liquid is at said predetermined level, an elongated tubular guide means having stop means at each end thereof, a buoyant moment producing float secured to one end of said tubular guide means, said tubular guide means being secured to said control lever with a substantial portion of said tubular guide means extending on each side of said fulcrum in the plane of oscillation of said control lever, impact and static force producing means positioned in said tubular guide means for reciprocating movement from one end to the other end of said tubular guide means in accordance with the angle between said tubular guide means and the horizontal, said impact and static force producing means initially providing an impact moment and thereafter providing a static moment about said fulcrum for selectively opening and closing said valve when said one end of said tubular guide means respectively falls below the horizontal and rises above the horizontal, and separate adjustment means for individually adjusting the impact moment and the static moment provided when said one end of said tubular guide means rises above the horizontal, so that the impact moment is sufficient to rapidly close said valve and the static moment is just sufficient to maintain said valve closed.

3. An apparatus for controlling the level of liquid in a container comprising, an inlet valve connected to a source of liquid, means including a control lever oscillatable in a plane about a fulcrum for opening said valve at liquid levels below said predetermined level and closing said valve when said liquid is at said predetermined level, an elongated tubular guide means having stop means at each end thereof, a buoyant moment producing float secured to one end of said tubular guide means, said tubular guide means being secured to said control lever with a substantial portion of said tubular guide means extending on each side of said fulcrum in the plane of oscillation of said control lever, impact and static force producing means positioned in said tubular guide means for reciprocating movement from one end to the other end of said tubular guide means in accordance with the angle between said tubular guide means and the horizontal, said impact and static force producing means initially providing an impact moment and thereafter providing a static moment about said fulcrum for selectively opening and closing said valve when said one end of said tubular guide means respectively falls below the horizontal and rises above the horizontal, and separate adjustment means for individually adjusting the static moment produced by said force producing means and the buoyant moment produced by said float when said one end of said tubular guide means falls below the horizontal.

4. The combination in accordance with claim 3, wherein said separate adjustment means comprises first means for varying the length of said portion of said tubular guide means on each side of said fulcrum to control said static moment and second means for adjusting the position of said float on said one end of said guide means.

References Cited in the file of this patent

UNITED STATES PATENTS

| Number | Name | Date |
|---|---|---|
| 461,439 | King | Oct. 20, 1891 |
| 464,249 | Farley | Dec. 1, 1891 |
| 529,243 | Buick | Nov. 13, 1894 |
| 555,861 | Harvey | Mar. 3, 1896 |
| 741,343 | Keddington | Oct. 13, 1903 |
| 1,049,131 | Moritzky | Dec. 31, 1912 |
| 1,466,671 | Mori | Sept. 4, 1923 |
| 1,645,639 | Anderson | Oct. 18, 1927 |
| 2,248,433 | Miller | July 8, 1941 |
| 2,394,994 | Gibb | Feb. 19, 1946 |

FOREIGN PATENTS

| Number | Country | Date |
|---|---|---|
| 10,377 | Great Britain | Apr. 29, 1911 |
| 431,200 | Great Britain | July 1, 1935 |
| 722,304 | France | Dec. 29, 1931 |